United States Patent [19]

Shima et al.

[11] Patent Number: 4,548,882
[45] Date of Patent: Oct. 22, 1985

[54] STORAGE BATTERY PLATE-GRID AND RETAINER CONSTRUCTION

[75] Inventors: Toshiaki Shima, Osaka; Naozi Hamamuro, Nabari; Shinichi Ikari, Kumagaya; Tuneo Fuzishiro, Nabari, all of Japan

[73] Assignee: Shin-Kobe Electric Machinery Co., Ltd., Tokyo, Japan

[21] Appl. No.: 582,954

[22] Filed: Apr. 5, 1984

Related U.S. Application Data

[62] Division of Ser. No. 310,049, Oct. 9, 1981, Pat. No. 4,499,929.

[51] Int. Cl.$^4$ .............................................. H01M 4/73
[52] U.S. Cl. .................................. 429/211; 429/234; 429/246
[58] Field of Search ............... 429/233, 234, 237, 241, 429/244, 215, 246, 131, 138, 139, 211, 136

[56] References Cited

U.S. PATENT DOCUMENTS

| | | | |
|---|---|---|---|
| 723,326 | 3/1903 | Sperry | 429/139 |
| 2,490,630 | 12/1949 | Jardine | 429/138 |
| 2,615,061 | 10/1952 | Brandt | 429/234 X |
| 3,690,950 | 9/1972 | Wheadon et al. | 429/241 X |
| 3,738,871 | 6/1973 | Scholle | 429/241 X |
| 3,944,432 | 3/1976 | Brinkmann et al. | 429/234 |
| 3,956,012 | 5/1976 | Scholle | 429/234 |
| 4,206,277 | 6/1980 | Faber et al. | 429/241 X |

Primary Examiner—Anthony Skapars
Attorney, Agent, or Firm—Pearne, Gordon, Sessions, McCoy, Granger & Tilberry

[57] ABSTRACT

This invention relates to a process of producing a plate for a lead storage battery. A plate grid of lead material such as lead or lead alloy is formed by casting and a frame of acid-resisting plastic material is formed by molding which is to surround the plate grid. A plate substrate is formed by placing the plate grid into the frame. The plate substrate is filled with paste of lead oxide on both sides of the plate substrate, and then the paste filled in the plate substrate is partly dried. Thereafter, the plate substrate filled with the paste is covered with an acid-resisting fiber mat which is thermally adhered to the frame of the plate substrate. This invention also relates to a plate for a lead storage battery produced by the aforementioned process.

4 Claims, 14 Drawing Figures

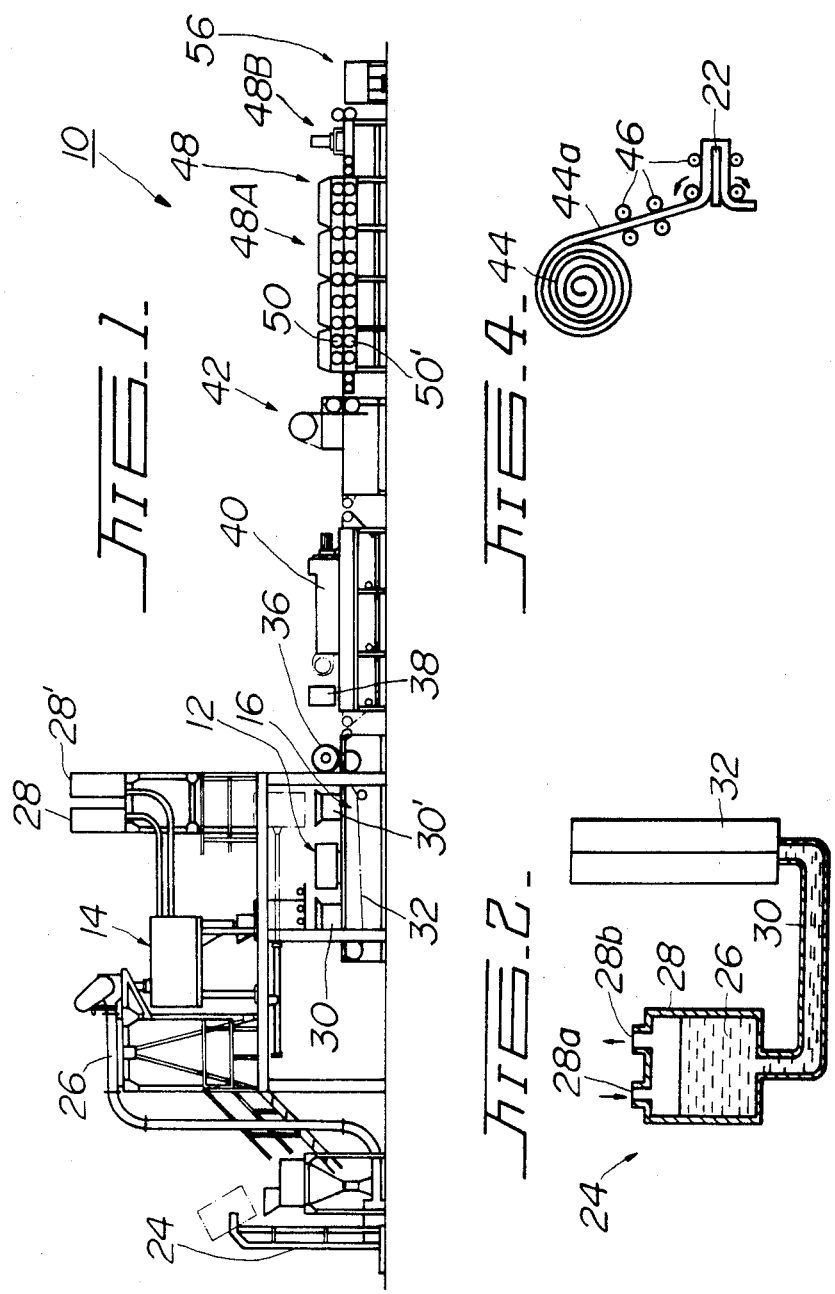

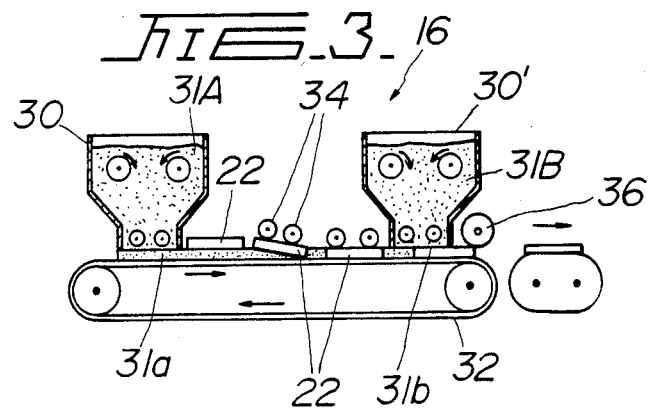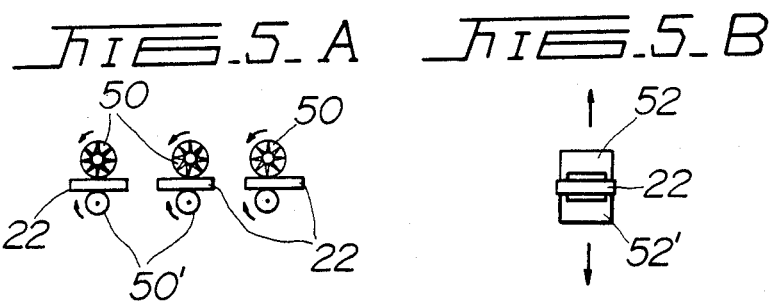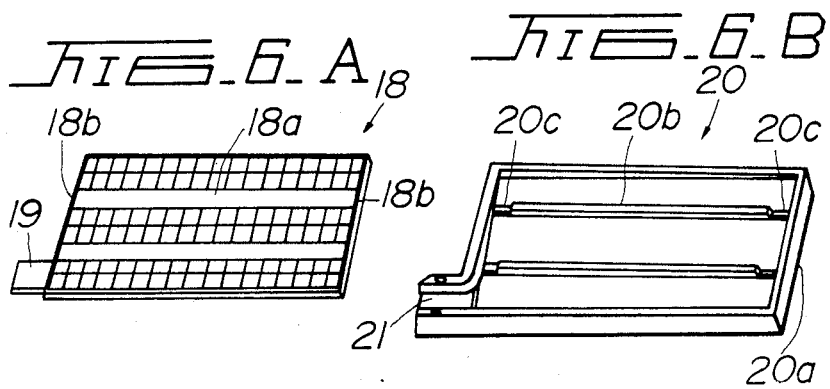

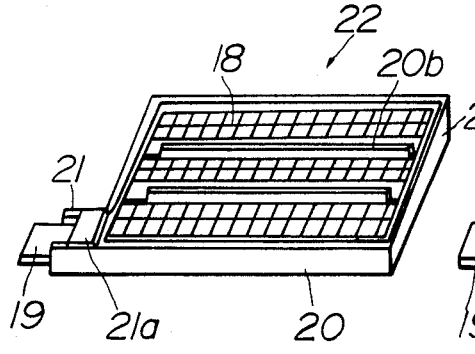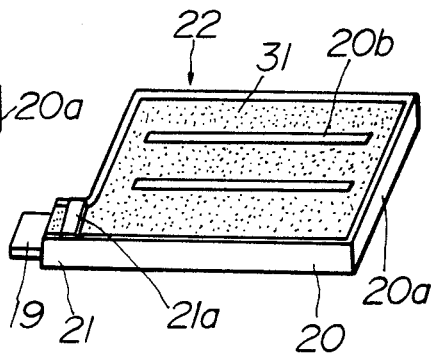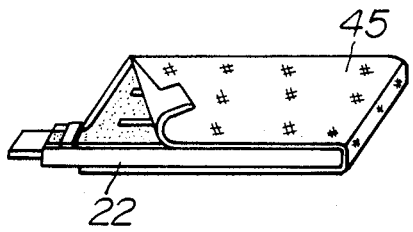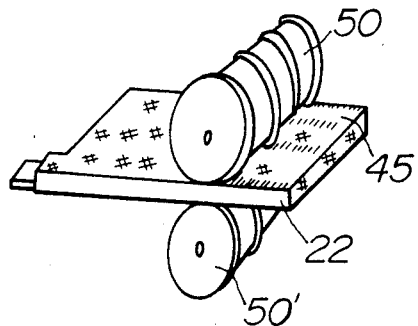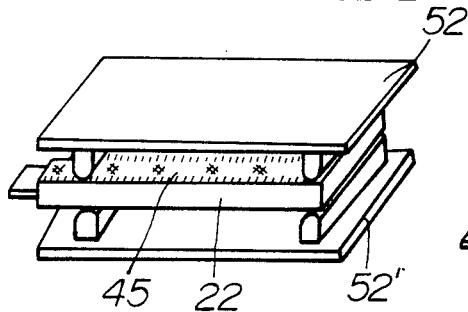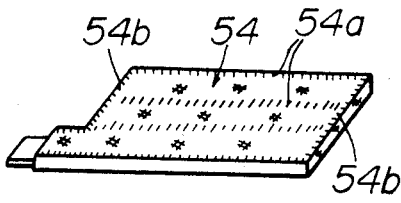

STORAGE BATTERY PLATE-GRID AND RETAINER CONSTRUCTION

This is a division of application Ser. No. 310,049, filed Oct. 9, 1981, now U.S. Pat. No. 4,499,929.

BACKGROUND OF THE INVENTION

In general, there have been two types of plate for a lead storage battery, one of which is of paste type and the other of which is of clad type.

The paste type plate is disposed between adjacent sets of a glass fiber mat and an insulated separator with a slight pressure applied to a group of plates. Although such a plate can be easily and inexpensively produced, it disadvantageously has a shorter life because active material for a positive plate falls out of the plate grid as charging and discharging are repeated, with the result that the adjacent plates are electrically shorted. On the other hand, the clad type plate has a longer life, but the steps of producing it, such as forming a clad tube and filling the clad tube with active material are complicated so that the cost for producing the plate is uneconomically higher.

Of late, there has been proposed a plate for a lead storage battery which has an advantage of the paste type plate and that of the clad type plate in combination (see U.S. Pat. No. 4,055,711). The proposed plate comprises a plate grid of lead or lead alloy filled with pasted active material and a pair of holders of porous insulated material provided on both sides of the plate grid. A pair of porous holders are provided with a plurality of longitudinal ribs which are butted against each other on bonded to latitudinal members of the plate grid. Thus, it will be noted that troublesome operations of bonding the longitudinal ribs to the holders and of butting them against each other or bonding them to the plate grid have to be done, which causes the effectiveness of operations to be lower and also the operations to be prevented from being automatically done.

SUMMARY OF THE INVENTION

Accordingly, it is a principal object of the invention to provide a process of producing a plate for a lead storage battery in which complicated steps of operation are eliminated.

It is another object of the invention to provide a process of producing a plate for a lead storage battery in which the plate having a longer life can be produced.

It is another object of the invention to provide a process of producing a plate for a lead storage battery in which the plate can be automatically produced.

It is further object of the invention to provide a plate for a lead storage battery which can be automatically produced and has a longer life.

In accordance with the invention, there is provided a process of producing a plate for a lead storage battery comprising the steps of casting a plate grid of lead material; molding a frame of acid-resisting plastic material which is to surround said plate grid; placing said plate grid into said frame to form a plate substrate; preparing a paste of lead oxide which is to be active material; filling said plate substrate with said paste on both sides of said plate substrate; partly drying said paste filled in said plate substrate; placing an acid-resisting fiber mat onto said plate substrate so that said plate substrate filled with said paste is covered with said fiber mat; and thermally adhering said fiber mat to said frame of said plate substrate whereby said plate is completed.

In accordance with another aspect of the invention, there is provided a plate for a lead storage battery comprising a plate substrate including a plate grid of lead material and a frame of acid-resisting plastic material which surrounds said plate grid, said plate grid being filled with active material, and an acid-resisting fiber mat with which said plate substrate is covered and which is thermally adhering to said frame of said plate substrate.

BRIEF DESCRIPTION OF THE DRAWINGS

The above and other objects and features of the invention will be apparent from the description of the embodiment taken along with the accompanying drawing in which:

FIG. 1 schematically illustrates an apparatus for carrying out a process of the invention;

FIG. 2 is a cross sectional view of a plate grid casting machine used for the process of the invention;

FIG. 3 is a cross sectional view of a paste filling machine used for the process of the invention;

FIG. 4 is a side view of a mat supplying machine used for the process of the invention;

FIG. 5A schematically illustrates a portion of a mat bonding machine in a side view;

FIG. 5B schematically illustrates another portion of the mat bonding machine in a front view;

FIGS. 6A to 6H sequentially illustrates the steps of producing a plate in accordance with the invention in a perspective view.

DETAILED DESCRIPTION OF THE EMBODIMENT

FIG. 1 illustrates an apparatus 10 for carrying out a process of the invention which comprises a substrate supplying machine 12, a paste kneading machine 14 and a paste filling machine 16.

The substrate supplying machine 12 serves to supply one by one to the paste filling machine 16, plate substrates 22 shown in FIG. 6C which are formed by combining plate grids 18 of lead or lead alloy as shown in FIG. 6A with frames 20 of acid-resisting plastic material shown in FIG. 6B, respectively. As shown in FIG. 2, the plate grids 18 of lead or lead alloy may be formed by a pressure injecting type casting machine 24. With the casting machine 24, as a pressurized gas such as inert gas is supplied to a molten metal bath 28 in which molten metal 26 of lead or lead alloy is contained, through a pressurizing port 28a thereof, the molten metal 26 is injected through a conduit 30 into a casting mold 32 to form the plate grids 18. Since the thus formed plate grids 18 have no lead oxide contained therein and in addition thereto, are formed while they are pressurized, they have a fine organization so that they have an improved anticorrosion. In the illustrated embodiment, each of the plate grids has longitudinally extending slots 18a spaced widthwise from each other. The plate grid 18 includes an ear 19 which is to be connected to a terminal of a lead storage battery.

The plastic frames 20 may be formed by an injection molding machine. Each of the plastic frames 20 includes a wall 20a which is to surround the periphery of the plate grid 18 and longitudinal members 20b which are provided corresponding to the slots 18a of the plate grid 18. As shown in FIG. 6C, the longitudinal members 20b at both ends have a reduced thickness so as to form grooves 20c which rims 18b of the frame 18 are to enter.

As shown in FIG. 6C, the plate grid 18 is placed into the plastic frame 20 by suitable means not shown to form the plate substrate 22. Placing the plate grid 18 into the plastic frame 20 may be made while the plastic frame 20 is conveyed by a conveyor not shown. The plastic frame 20 includes a bottomed ear 21 which the ear 19 of the plate grid 18 is to enter. After the ear 19 of the plate grid 18 enters the ear 21 of the frame 20, a holding plate 21a holds the ear 19 in the ear 21 of the plastic frame 20. The leading end of the ear 19 protrudes out of the ear 21 of the plastic frame 21.

As shown in FIG. 1, the paste kneading machine 14 produces a paste by kneading lead power with kneading solution such as sulfuric acid and water. The lead powder may be supplied from a lead powder supply 24 through a conveyor 26 to the paste kneading machine while the kneading solution may be supplied from kneading solution tanks 28 and 28'. The thus produced paste is supplied to two hoppers 30 and 30' of the paste filling machine 16.

The paste substrate 22 supplied by the substrate supplying machine 12 to the paste filling machine 16 is mounted on a belt conveyor 32 of the paste filling machine 16 as shown in FIG. 3. A paste 31A in the hopper 30 may be extended in the form of sheet 31a on the belt conveyor 32 and the plate substrate 22 may be mounted on the sheet 31a of the paste. Guide rollers 34 pressurize the plate substrate 22 so that the paste sheet 31a is forced into the plate substrate 22 at its bottom while it is supplied together with the belt conveyor 32 to the next hopper 30'. A paste 31B in the hopper 30' is forced in the form of sheet 31b into the plate substrate 22 at its upper side. FIG. 6D shows the plate substrate 22 filled with the paste 31 in this manner.

At the outlet of the paste filled machine 16 is provided squeezing rollers 36 which make the paste 31 in the plate substrate 22 have the same thickness as that of the plastic frame 20. Downstream of the squeezing rollers 36 are provided a shower bath 38 which sprays a solution of dilute sulfuric acid of about 1 normal to form lead sulfate on the surface of the active material.

The thus paste filled plate substrate 22 is supplied to a drier 40. If the paste in the plate substrate is fully dried by the drier 40, the plastic frame 20 tends to be deformed and the active material tends to be cracked. To avoid it, the paste is partly dried preferably to evaporate about 50% of the water. Although not shown, a scraper may be preferably provided downstream of the drier 40 which scrapes the paste on the plastic frame 20 at its upper and lower faces.

The plate substrate 22 with the paste thus dried is then introduced into a mat supplying machine 42. As shown in FIG. 4, a mat tape 44a is supplied from a tape roll 44 of mat material through guide rollers 46 in the mat supplying machine 42 and then folded around the plate substrate 22 so that it is covered with the mat tape 44a which is cut off by a cutter, not shown, from the subsequent mat tape 44a. FIG. 6E shows that plate substrate 22 covered with a mat 45. The mat material may be composed of acid-resisting woven fiber or non-woven fiber such as glass fiber.

The plate substrate 22 covered with the mat 45 is then introduced into a mat bonding machine 48. As shown in FIGS. 5A and 6F, in the mat bonding machine 48, while the plate substrate 22 passes through pairs of upper and lower heating rollers 50 and 50' spaced from each other on the direction on which the plate substrate 22 moves, the mat 45 is thermally adhered to the plastic frame 20 along its side edges and also at its longitudinal members 20b. As shown in FIGS. 5B and 6G, the plate substrate 22 is positioned between a pair of upper and lower heating dies 52 and 52' to thermally adhered the mat 45 to the plastic frame 20 along its upper and lower edges. FIG. 6H shows a plate 54 thus produced. In this figure, reference numerals 54a designates thermally adhered longitudinal portions while reference numerals 54b designate thermally adhered latitudinal portions. The thermally adhered portions 54a and 54b are formed by a longitudinal bonding section 48A and a latitudinal bonding section 48B of the mat bonding machine 48. The space between the upper and lower heating rollers 50 and 50' may be preferably smaller toward the outlet of the mat bonding machine because the bonding strength of the mat 45 is more improved. The heating rollers may be disposed alternately on the upper side and on the lower side and cooling rubber rollers may be disposed on the opposite sides.

The thus produced plate 54 is fed to a loader 56 in which a support is lowered by the distance corresponding to the thickness of the plate 54 everytime the plate 54 is fed, so as to load a plurality of plates 54 on the loader.

As shown in FIG. 1, since many plate substrates 22 are sequentially fed by the respective conveyors through the drier 40, the mat supplying machine 42 and the mat bonding machine 48, many plates 54 may be continuously produced.

While one preferred embodiment of the invention has been illustrated and described with reference to the accompanying drawings, it will be understood by those skilled in the art that it is by way of example, and that various changes and modifications may be made without departing from the spirit and scope of the invention, which is intended to be defined only by the appended claims.

What is claimed is:

1. A plate for a storage battery, comprising in combination:
    a unitary metal plate grid;
    a unitary frame of plastic surrounding said plate grid, said unitary frame having a peripheral wall and plural longitudinal members each having portions thereof exposed on each side of said plate grid;
    a paste of electrochemically active material filling said plate grid on both sides and filling said plastic frame;
    a fiber mat adhered to said exposed portions on each side of said frame means; and
    said plastic and said fiber mat being resistant to the electrolyte of a storage battery.

2. A plate for a storage battery as set forth in claim 1, wherein said unitary plate grid has a plurality of longitudinal slots spaced from each other widthwise while said plastic frame has said plurality of longitudinal members provided corresponding to said longitudinal slots in said plate grid, said longitudinal members of said plastic frame extending through said longitudinal slots in said plate grid to have exposed portions on both faces.

3. A plate for a storage battery as set forth in claim 1, wherein said exposed portions are continuous around the outside peripheral wall of said frame means.

4. A plate for a storage battery as set forth in claim 1, wherein said unitary plastic frame includes a bottomed ear completely encircling a connecting ear on said plate grid.

* * * * *